(12) United States Patent
Jain et al.

(10) Patent No.: US 12,417,221 B2
(45) Date of Patent: Sep. 16, 2025

(54) ONLINE MIGRATION FROM AN EVENTUALLY CONSISTENT SYSTEM TO A STRONGLY CONSISTENT SYSTEM

(71) Applicant: Google LLC, Mountain View, CA (US)

(72) Inventors: Lavina Jain, Santa Clara, CA (US); Sean Quinlan, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 15 days.

(21) Appl. No.: 17/716,093

(22) Filed: Apr. 8, 2022

(65) Prior Publication Data

US 2023/0325378 A1 Oct. 12, 2023

(51) Int. Cl.
*G06F 7/00* (2006.01)
*G06F 16/23* (2019.01)
*G06F 16/27* (2019.01)
*G06F 17/00* (2019.01)

(52) U.S. Cl.
CPC ...... *G06F 16/2365* (2019.01); *G06F 16/2322* (2019.01); *G06F 16/273* (2019.01)

(58) Field of Classification Search
CPC . G06F 16/2365; G06F 16/273; G06F 16/2322
See application file for complete search history.

(56) References Cited

U.S. PATENT DOCUMENTS

| | | | |
|---|---|---|---|
| 10,303,699 B1 * | 5/2019 | Holenstein | G06F 11/3476 |
| 2007/0156842 A1 | 7/2007 | Vermeulen et al. | |
| 2010/0191884 A1 * | 7/2010 | Holenstein | G06F 16/2343 |
| | | | 707/613 |
| 2011/0185141 A1 * | 7/2011 | Dhuse | G06F 3/067 |
| | | | 711/E12.002 |
| 2014/0074780 A1 * | 3/2014 | Goetsch | G06F 16/273 |
| | | | 707/613 |
| 2014/0181021 A1 | 6/2014 | Montulli et al. | |
| 2014/0344227 A1 * | 11/2014 | Grube | H04L 67/1097 |
| | | | 707/812 |
| 2014/0372374 A1 | 12/2014 | Bourbonnais et al. | |
| 2015/0378767 A1 * | 12/2015 | Tarasuk-Levin | G06F 9/4856 |
| | | | 718/1 |

(Continued)

OTHER PUBLICATIONS

International Search Report and Written Opinion for International Application No. PCT/US2023/010746 dated May 2, 2023. 14 pages.

*Primary Examiner* — Tuan A Pham
(74) *Attorney, Agent, or Firm* — Lerner David LLP

(57) ABSTRACT

Generally disclosed herein is an approach to migrate data from a first type of distributed system to a second type of distributed system without locking data, where transactional dual writes are not available across the two systems. The approach starts by setting up a bi-directional replication between the first system and the second system. The first system will initially operate as a primary system, where the primary system receives and serves write requests from clients or other devices. For each write to the first system, the second system is updated with an asynchronous write. When the second system is caught up to the first system, such that both the first and second systems reflect approximately the same data, the second system can be switched over to serve as the primary system. The second system can now directly receive and serve all future read and write requests.

18 Claims, 11 Drawing Sheets

(56) References Cited

U.S. PATENT DOCUMENTS

| | | | |
|---|---|---|---|
| 2016/0171068 A1* | 6/2016 | Hardin | G06F 16/24565 |
| | | | 707/610 |
| 2019/0102269 A1* | 4/2019 | Abouelwafa | H04L 67/1095 |
| 2019/0171650 A1 | 6/2019 | Botev et al. | |
| 2019/0392072 A1* | 12/2019 | Ben-Romdhane | G06F 16/27 |
| 2020/0050687 A1 | 2/2020 | Kaushik et al. | |
| 2021/0141802 A1 | 5/2021 | Labovich et al. | |
| 2021/0286684 A1* | 9/2021 | Nara | G06F 11/3013 |

* cited by examiner

ONLINE MIGRATION FROM AN EVENTUALLY CONSISTENT SYSTEM TO A STRONGLY CONSISTENT SYSTEM

BACKGROUND

Data migration involves moving data from one system to another system. For example, data could migrate from one database to another, one format to another, or one application to another. Migration is usually done to replace or augment legacy systems with new systems that will share the same dataset.

Migration from a first system to a second system usually involves starting transactional dual writes across the two systems, copying data from the first system to the second system, and making the second system the primary system when all data from the first system has been copied to the second system. However, this approach cannot be used if transactional dual writes are not possible across the two systems, such as from an eventually consistent system to a strongly consistent system. Existing solutions for this type of scenario require locking during migration, where data cannot be read or modified while the lock is held.

BRIEF SUMMARY

Generally disclosed herein is an approach to migrate data from a first type of distributed system to a second type of distributed system without locking data, where transactional dual writes are not available across the two systems. The approach starts by setting up a bi-directional replication between the first system and the second system. The first system will initially operate as a primary system, where the primary system receives and serves write requests from clients or other devices. For each write to the first system, the second system is updated with an asynchronous write. When the second system is caught up to the first system, such that both the first and second systems reflect approximately the same data, the second system can be switched over to serve as the primary system. The second system can now directly receive and serve all future read and write requests.

Aspects of the disclosure provide for a method for migrating data from a first type of distributed system to a second type of distributed system. The method includes starting, with one or more processors, a bi-directional replication of data between the first system and the second system; receiving at the first system a first request to write first data; writing, with the one or more processors, the first data to the first system; asynchronously writing, with the one or more processors, the first data to the second system; determining, with the one or more processors, that the second system is caught up to the first system such that it can accurately serve read requests; and switching, with the one or more processors, the second system to be a primary system for serving reads and writes.

In one example, the method further includes receiving at the second system a second request to write second data; writing, with the one or more processors, the second data to the second system; and asynchronously writing, with the one or more processors, the second data to the first system. In another example, the method further includes stopping, with the one or more processors, the bi-directional replication. In another example, the first system includes an eventually consistent system and the second system includes a strongly consistent system. In another example, the bi-directional replication includes iteratively and continuously copying data from the first system to the second system. In another example, the bi-directional replication further includes iteratively and continuously copying data from the second system to the first system.

In another example, the method further includes comparing, with the one or more processors, a first timestamp of a write to the first system with a second timestamp of a write to the second system; and determining, with the one or more processors, that a read served by either the first system or the second system will be successful based on comparing the first timestamp and the second timestamp. The read served by either the first system or the second system will be successful when the first timestamp and the second timestamp are within a threshold range of one another.

In another example, the method further includes comparing, with the one or more processors, an aggregate difference between data in the first system and data in the second system; and determining, with the one or more processors, that a read served by either the first system or the second system will be successful based on comparing the aggregate difference. The read served by either the first system or the second system will be successful when the aggregate difference is below a threshold.

In another example, the method further includes reporting, with the one or more processors, a metric from the bi-directional replication; and determining, with the one or more processors, that a read served by either the first system or the second system will be successful based on the reported metric. The read served by either the first system or the second system will be successful when the reported metric is below a threshold.

Another aspect of the disclosure provides for a system including one or more processors; and one or more storage devices coupled to the one or more processors and storing instructions, when performed by the one or more processors, causes the one or more processors to perform operations for migrating data from a first type of distributed system to a second type of distributed system. The operations include starting a bi-directional replication of data between the first system and the second system; writing first data to the first system based on a received first request to write the first data; asynchronously writing the first data to the second system; determining that the second system is caught up to the first system such that it can accurately serve read requests; and switching the second system to be a primary system for serving reads and writes.

In one example, the operations further include writing second data to the second system based on a received second request to write the second data; and asynchronously writing the second data to the first system. In another example, the operations further include stopping the bi-directional replication. In another example, the first system includes an eventually consistent system and the second system includes a strongly consistent system. In another example, the bi-directional replication includes iteratively and continuously copying data from the first system to the second system. In another example, the bi-directional replication further includes iteratively and continuously copying data from the second system to the first system.

In another example, the operations further include comparing a first timestamp of a write to the first system with a second timestamp of a write to the second system; and determining that a read served by either the first system or the second system will be successful based on comparing the first timestamp and the second timestamp. The read served by either the first system or the second system will be successful when the first timestamp and the second timestamp are within a threshold range of one another.

In another example, the operations further include comparing an aggregate difference between data in the first system and data in the second system; and determining that a read served by either the first system or the second system will be successful based on comparing the aggregate difference. The read served by either the first system or the second system will be successful when the aggregate difference is below a threshold.

In another example, the operations further include reporting a metric from the bi-directional replication; and determining that a read served by either the first system or the second system will be successful based on the reported metric. The read served by either the first system or the second system will be successful when the reported metric is below a threshold.

Yet another aspect of the disclosure provides for a non-transitory computer readable medium for storing instructions that, when executed by one or more processors, causes the one or more processors to perform operations for migrating data from a first type of distributed system to a second type of distributed system. The operations include starting a bi-directional replication of data between the first system and the second system; writing first data to the first system based on a received first request to write the first data; asynchronously writing the first data to the second system; determining that the second system is caught up to the first system such that it can accurately serve read requests; and switching the second system to be a primary system for serving reads and writes.

In one example, the operations further include comparing a first timestamp of a write to the first system with a second timestamp of a write to the second system; and determining that a read served by either the first system or the second system will be successful based on comparing the first timestamp and the second timestamp. The read served by either the first system or the second system will be successful when the first timestamp and the second timestamp are within a threshold range of one another.

DETAILED DESCRIPTION

Generally disclosed herein is an approach to migrate data from a first type of distributed system to a second type of distributed system without locking data, where transactional dual writes are not available across the two systems. The first type of distributed system can be an eventually consistent system and the second type of distributed system can be a strongly consistent system. The two systems may continue to serve read and write requests during migration.

The approach starts by setting up a bi-directional replication between the first system and the second system. Bi-directional replication may include iteratively and continuously reading the data from both systems, comparing the data, and copying any newer data from either system to the other.

The first system will initially operate as a primary system, where the primary system receives and serves write requests from clients or other devices. For each write to the first system, the second system is updated with an asynchronous write. The asynchronous write to the second system may or may not be successful. However, even if unsuccessful, the data written to the first system will ultimately be copied to the second system as part of the bi-directional replication.

When the second system is caught up to the first system, such that both the first and second systems reflect approximately the same data, the second system can be switched over to serve as the primary system. As an example, it may be determined that the second system is approximately caught up based on comparing timestamps of writes of data to the first system and with timestamps of writes of data to the second system. As another example, it may be determined that the second system is approximately caught up based on an aggregate difference between data in the first system and data in the second system. As yet another example, it may be determined that the second system is approximately caught up based on metrics reported from the bidirectional replication.

Once the second system begins to serve as the primary system, it may directly receive and serve all future read and write requests. As an example, the first system may continue to be updated asynchronously when writes to the second system, serving as the primary system, are made. As another example, maintenance of the first system may be discontinued and the second system may be solely relied upon for serving reads and writes.

Figure 1:
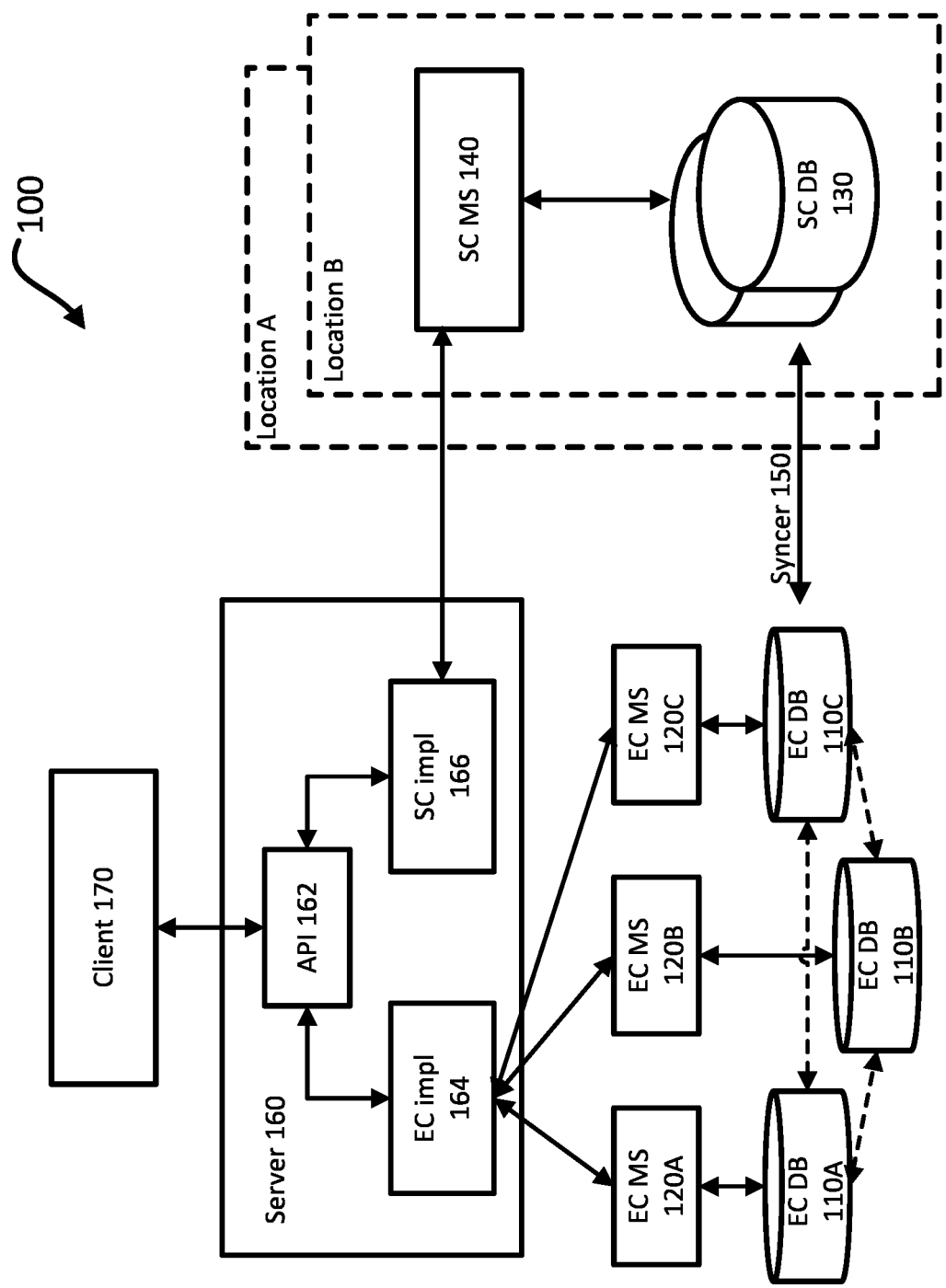
FIG. 1 depicts a block diagram of a migration system according to aspects of the disclosure.

FIG. 1 depicts an example migration system 100 that does not offer transactional dual writes. The migration system 100 can include a first distributed system, which can be an eventually consistent system, and a second distributed system. which can be a strongly consistent system. As an example, transactional dual writes may not be offered if the two distributed systems have different software, functionality, and/or APIs that are unable to interact with each other.

As another example, transactional dual writes may not be offered if one of the distributed systems does not support them.

The first distributed system, such as an eventually consistent system, can include a plurality of database replicas 110A-C and a management system 120A-C for each respective database. While only a few replicas are shown, it should be understood that the first distributed system can include any number of replicas and respective management systems. In an eventually consistent system, when a write is performed by a management system 120A in a distributed database 110A, multiple replicas 120B-C may not all reflect the same data until the write is fully copied by each management system 120A-C to all replicas 120A-C. Accordingly, for a time period between the write request and when the write is copied to all replicas 120A-C, the data in two different replicas 120A or 120B may not be the same. Accordingly, if read requests were served by either replica 120A or 120B during that time, the read requests from the two replicas 120A and 120B would produce inconsistent returns. Once the write is fully copied, however, where all replicas 120A-C reflect the same data, the distributed system would become consistent, and the replicas 120A-C would return the same data in response to read requests.

The second distributed system, such as a strongly consistent system, can include a plurality of database replicas 130 and one or more management systems 140 for the database replicas 130. It should be understood that the second distributed system can include any number of replicas and management systems. In a strongly consistent system, copies of data should be the same throughout the distributed database. For instance, if a write is made by the management system 140 to the distributed database replicas 130 at a given time, and a read request for the written data is received immediately after the write, the read request should return the same result regardless of which replica 130 serves the read request.

The migration system 100 can include a syncer program 150 for performing bi-directional replication between the first distributed system and the second distributed system. The syncer program 150 can be included in either management system 120, 140 or included on a separate computing device. Bi-directional replication can include iteratively and continuously reading data from both systems, comparing the data, and copying any newer data from either system to the other. Bi-directional replication can cause the second distributed system to be managed as if the second distributed system was a replica of the first distributed system.

The migration system 100 can include a migration server 160 for serving write requests of data from a client or other computing device 170 to the first distributed system and/or the second distributed system. The migration server 160 can also serve read requests from either the first distributed system or second distributed system to a client or other computing device 170. The migration server 160 can include an application programming interface (API) 162, a first implement 164 for transmitting and/or receiving data to/from the first distributed system, and a second implement 166 for transmitting and/or receiving data to/from the second distributed system.

For example, the API 162 may include sub-routines, data structures, object classes, and other types of software components used to allow servers and clients to communicate with each other. In one aspect, API may be a software module operable in conjunction with several types of operating systems known in the arts. For example, the client may be connected to a Structured Query Language (SQL) database server that may operate in conjunction with the API for saving and retrieving information data. The API 162 can determine whether received data from a write request of the client 170 should be served to the first distributed system and asynchronously to the second distributed system, or should be served to the second distributed system, to be further described below with reference to FIGS. 3A-5.

The client device 170 may be configured with a processor, memory, instructions, and data. The client may be a personal computer, intended for use by a person having all the internal components normally found in a personal computer such as a central processing unit (CPU), hard drive, and input/output device, and all of the components used for connecting these elements to one another. The client 170 may be any device capable of processing instructions and transmitting data to and from humans and other computers including general purpose computers, tablets, mobile phones, smartwatches, home assistants, video game systems, network computers lacking local storage capability, set top boxes for televisions, and other networked devices.

The client 170 may include an application interface module used to access a service made available by the server 160. For example, the application interface module may include sub-routines, data structures, object classes and other types of software components used to allow servers and clients to communicate with each other. In one aspect, the application interface module may be a software module operable in conjunction with several types of operating systems known in the arts. For example, the client may be connected to a Structured Query Language (SQL) database server that may operate in conjunction with the application interface module for saving and retrieving information data.

The server 160 may serve requests from the client 170 over a network. The network, and intervening nodes, may include various configurations and protocols including the Internet, World Wide Web, intranets, virtual private networks, wide area networks, local networks, private networks using communication protocols proprietary to one or more companies, Ethernet, WiFi, Bluetooth, and HTTP, and various combinations of the foregoing. Such communication may be facilitated by a device capable of transmitting data to and from other computers, such as modems (e.g., dial-up, cable or fiber optic) and wireless interfaces.

Figure 2:
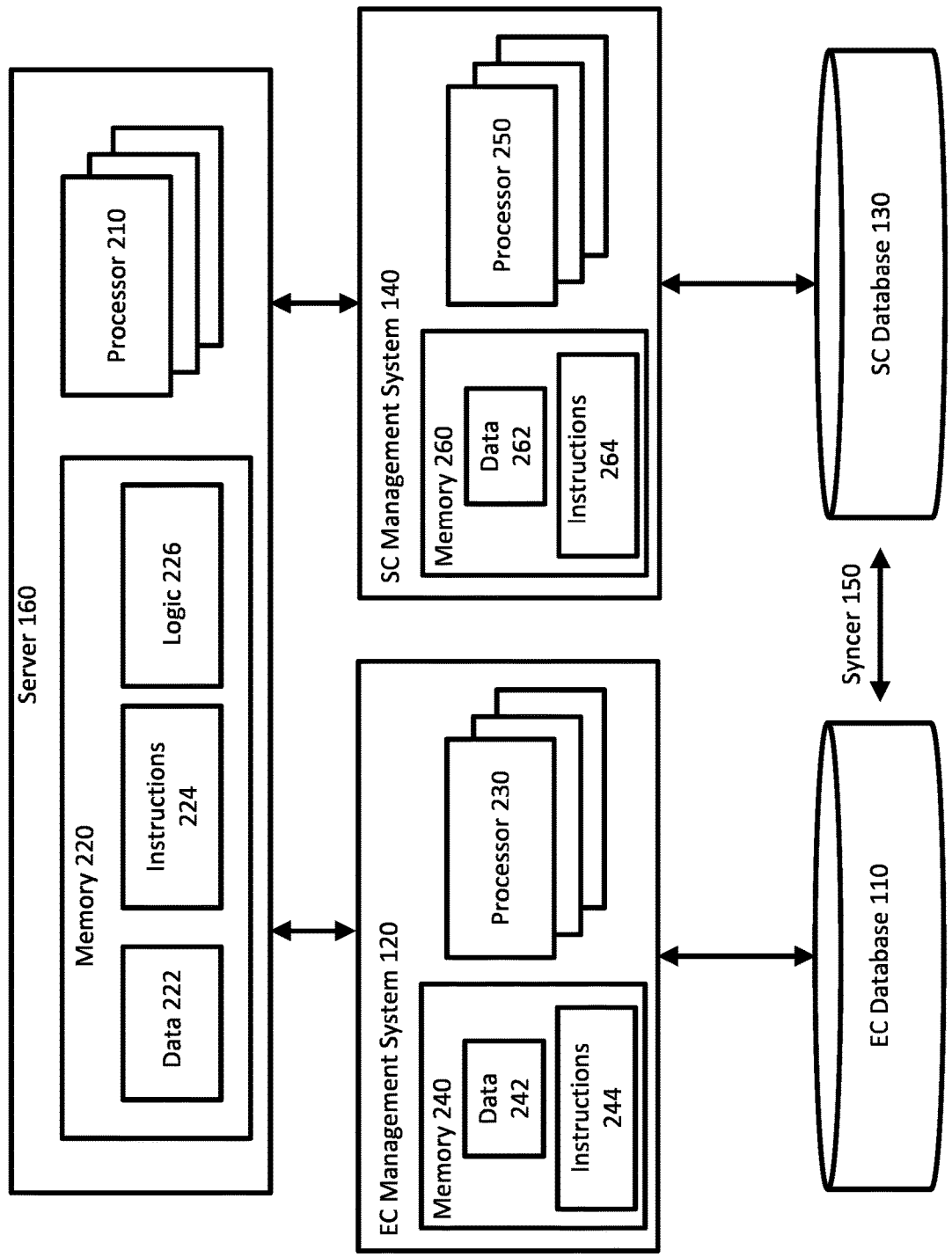
FIG. 2 depicts a block diagram further describing the migration system according to aspects of the disclosure.

FIG. 2 depicts further details of the management system 120, management system 140, and server 160 for the migration system 100.

The server 160 includes a set of computing resources such as one or more processors 210 and memory 220. The processors 210 are configured to execute data 222 and instructions 224 stored in memory 220. For example, the processors 210 can execute logic 226 to control whether to serve the data 222 to the first distributed system and/or the second distributed system.

The processors 210 can be any processors, including one or more central processing units (CPUs), graphic processing units (GPUs), field programmable gate arrays (FPGAs), and/or application specific integrated circuits (ASICs). Although not necessary, the server 160 can include specialized hardware components to perform specific computing processes. The memory 220 can be a type of non-transitory computer readable medium capable of storing information accessible by the processor 210, such as a hard-drive, solid state drive, tape drive, optical storage, memory card, ROM, RAM, DVD, CD-ROM, write-capable, and read-only memories.

The memory 220 can store information accessible by the processor 210, including instructions 224 that can be executed by the processor 210 and that can be retrieved, manipulated, or stored by the processor 210. The instructions 224 can be a set of instructions executed directly, such as machine code, or indirectly, such as scripts, by the processor 210. In this regard, the terms "instructions", "steps", and "programs" can be used interchangeably herein. The instructions can be stored in object code format for direct processing by the processor 210, or other types of computer language including scripts or collections of independent source code modules that are interpreted on demand or compiled in advance. Functions, methods, and routines of the instructions are explained in more detail in the foregoing examples and the example methods below.

The data 222 can be retrieved, stored, or modified by the processor 210 in accordance with the instructions. The data 222 can also be formatted in a computer-readable format such as, but not limited to, binary values, ASCII, or Unicode. Moreover, the data 222 can include information sufficient to identify relevant information, such as numbers, descriptive text, proprietary codes, pointers, references to data stored in other memories, including other network locations, or information that is used by a function to calculate relevant data.

The memory 220 can include logic 226 for controlling data in the database 110. For example, the logic 226 can determine how transactions with the database 110 are handled. Depending on a state of the migration, the logic 226 can have read and write requests served differently. For example, and as described further below with reference to FIGS. 3A-5, if the first distributed system and the second distributed system are not yet approximately close, the logic 226 can have data read from or written to the first distributed system. The logic 226 can also have data asynchronously written to the second distributed system. If the first distributed system and the second distributed system have become approximately close, the logic 226 can have data read from or written to the second distributed system. The logic 226 can also have data asynchronously written to the first distributed system.

Although FIG. 2 functionally illustrates the processor, memory, and other elements of the server 160 as being within the same block, the processor, computer, computing device, or memory can actually comprise multiple processors, computers, computing devices, or memories that may or may not be stored within the same physical housing. For example, the memory can be a hard drive or other storage media located in housings different from that of the server 160. Accordingly, references to a processor, computer, computing device, or memory will be understood to include references to a collection of processors, computers, computing devices, or memories that may or may not operate in parallel. For example, the server 160 may operate as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The management system 120 can include one or more processors 230, memory 240, and other components for providing data to and/or receiving data from the database 110. The memory 240 can store information accessible by the processor 230, including instructions 244 that can be executed by the processor 230. Memory 240 can also include data 242 that can be retrieved, manipulated, or stored by the processor 230. The memory 240 may be a type of non-transitory computer readable medium capable of storing information accessible by the processor 230, such as a hard-drive, solid state drive, tape drive, optical storage, memory card, ROM, RAM, DVD, CD-ROM, write-capable, and read-only memories. The processors 230 can be any processors, including one or more central processing units (CPUs), graphic processing units (GPUs), field programmable gate arrays (FPGAs), and/or application specific integrated circuits (ASICs).

The instructions 244 can be a set of instructions executed directly, such as machine code, or indirectly, such as scripts, by the processor 230. The instructions 244 can be stored in object code format for direct processing by the processor 230, or other types of computer language including scripts or collections of independent source code modules that are interpreted on demand or compiled in advance.

The data 242 can be retrieved, stored, or modified by the processor 230 in accordance with the instructions 244. For instance, the data 242 can be stored in computer registers, in a relational database as a table having a plurality of different fields and records, or XML documents. The data 242 can also be formatted in a computer-readable format such as, but not limited to, binary values, ASCII, or Unicode. Moreover, the data 242 can include information sufficient to identify relevant information, such as numbers, descriptive text, proprietary codes, pointers, references to data stored in other memories, including other network locations, or information that is used by a function to calculate relevant data.

Although FIG. 2 functionally illustrates the processor 230 and memory 240 as being within the same block, the processor 230 and memory 240 may actually include multiple processors and memories that may or may not be stored within the same physical housing. For example, some of the instructions 244 and data 242 can be stored on a removable CD-ROM and others within a read-only computer chip. Some or all of the instructions and data can be stored in a location physically remote from, yet still accessible by, the processor 230. Similarly, the processor 230 can actually include a collection of processors, which may or may not operate in parallel.

The database 110 may be a single storage device or a plurality of storage devices, such as hard drives, random access memory, disks, disk arrays, tape drives, etc. The database 110 may implement any of a number of architectures and technologies, including, but not limited to, direct attached storage (DAS), network attached storage (NAS), storage area networks (SANs), fiber channel (FC), fiber channel over Ethernet (FCoE), mixed architecture networks, or the like. Further, in some examples the database 110 may include virtualized or containerized environments. For example, the database 110 may include one or more virtual machines running on a host machine. The database 110 may store, for example, data files, documents, code, schemas, persistence frameworks, applications, or any of a variety of other information or tools typically stored in databases.

The management system 140 can include one or more processors 250, memory 260, and other components for providing data to and/or receiving data from the database 130. The memory 260 can store information accessible by the processor 250, including instructions 264 that can be executed by the processor 250. Memory 260 can also include data 262 that can be retrieved, manipulated, or stored by the processor 250. The memory 260 may be a type of non-transitory computer readable medium capable of storing information accessible by the processor 250, such as a hard-drive, solid state drive, tape drive, optical storage, memory card, ROM, RAM, DVD, CD-ROM, write-capable, and read-only memories. The processors 250 can be any processors, including one or more central processing units (CPUs), graphic processing units (GPUs), field programmable gate arrays (FPGAs), and/or application specific integrated circuits (ASICs).

The instructions 264 can be a set of instructions executed directly, such as machine code, or indirectly, such as scripts, by the processor 250. The instructions 264 can be stored in object code format for direct processing by the processor 250, or other types of computer language including scripts or collections of independent source code modules that are interpreted on demand or compiled in advance.

The data 264 can be retrieved, stored, or modified by the processor 250 in accordance with the instructions 264. For instance, the data 262 can be stored in computer registers, in a relational database as a table having a plurality of different fields and records, or XML documents. The data 262 can also be formatted in a computer-readable format such as, but not limited to, binary values, ASCII, or Unicode. Moreover, the data 262 can include information sufficient to identify relevant information, such as numbers, descriptive text, proprietary codes, pointers, references to data stored in other memories, including other network locations, or information that is used by a function to calculate relevant data.

Although FIG. 2 functionally illustrates the processor 250 and memory 260 as being within the same block, the processor 250 and memory 260 may actually include multiple processors and memories that may or may not be stored within the same physical housing. For example, some of the instructions 264 and data 262 can be stored on a removable CD-ROM and others within a read-only computer chip. Some or all of the instructions and data can be stored in a location physically remote from, yet still accessible by, the processor 250. Similarly, the processor 250 can actually include a collection of processors, which may or may not operate in parallel.

The database 130 may be a single storage device or a plurality of storage devices, such as hard drives, random access memory, disks, disk arrays, tape drives, etc. The database 130 may implement any of a number of architectures and technologies, including, but not limited to, direct attached storage (DAS), network attached storage (NAS), storage area networks (SANs), fiber channel (FC), fiber channel over Ethernet (FCoE), mixed architecture networks, or the like. Further, in some examples the database 130 may include virtualized or containerized environments. For example, the database 130 may include one or more virtual machines running on a host machine. The database 130 may store, for example, data files, documents, code, schemas, persistence frameworks, applications, or any of a variety of other information or tools typically stored in databases.

Figure 3A:
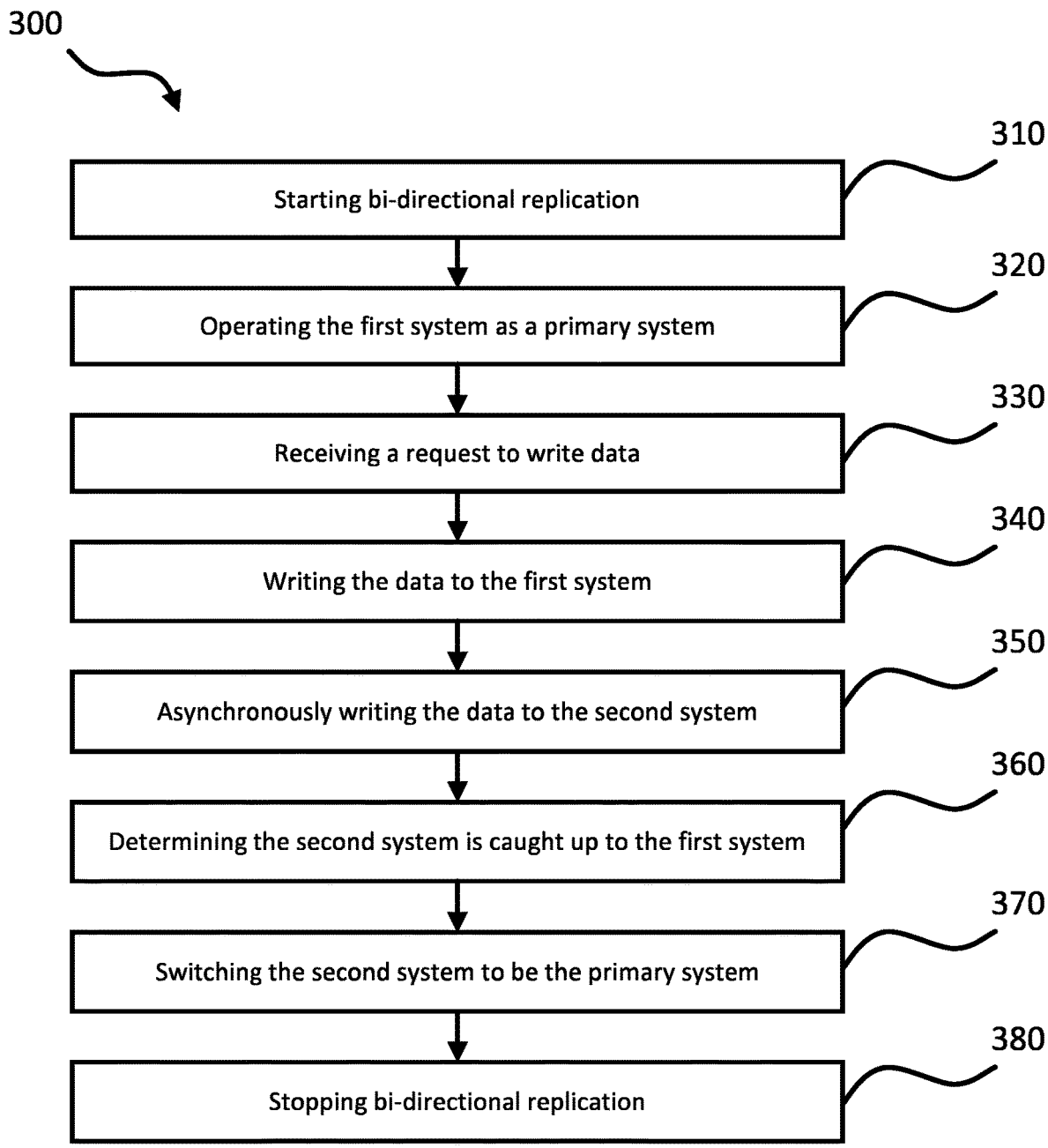
FIG. 3A depicts a flow diagram of an example process for migrating data between a first distributed system and a second distributed system according to aspects of the disclosure.

FIG. 3A depicts a flow diagram of an example process 300 for migrating data between a first distributed system and a second distributed system, where transactional dual writes are not available across the two systems. The example process 300 can be performed on a system of one or more processors in one or more locations. For example, the migration system 100, as described above, can perform the process 300.

Figure 3B:
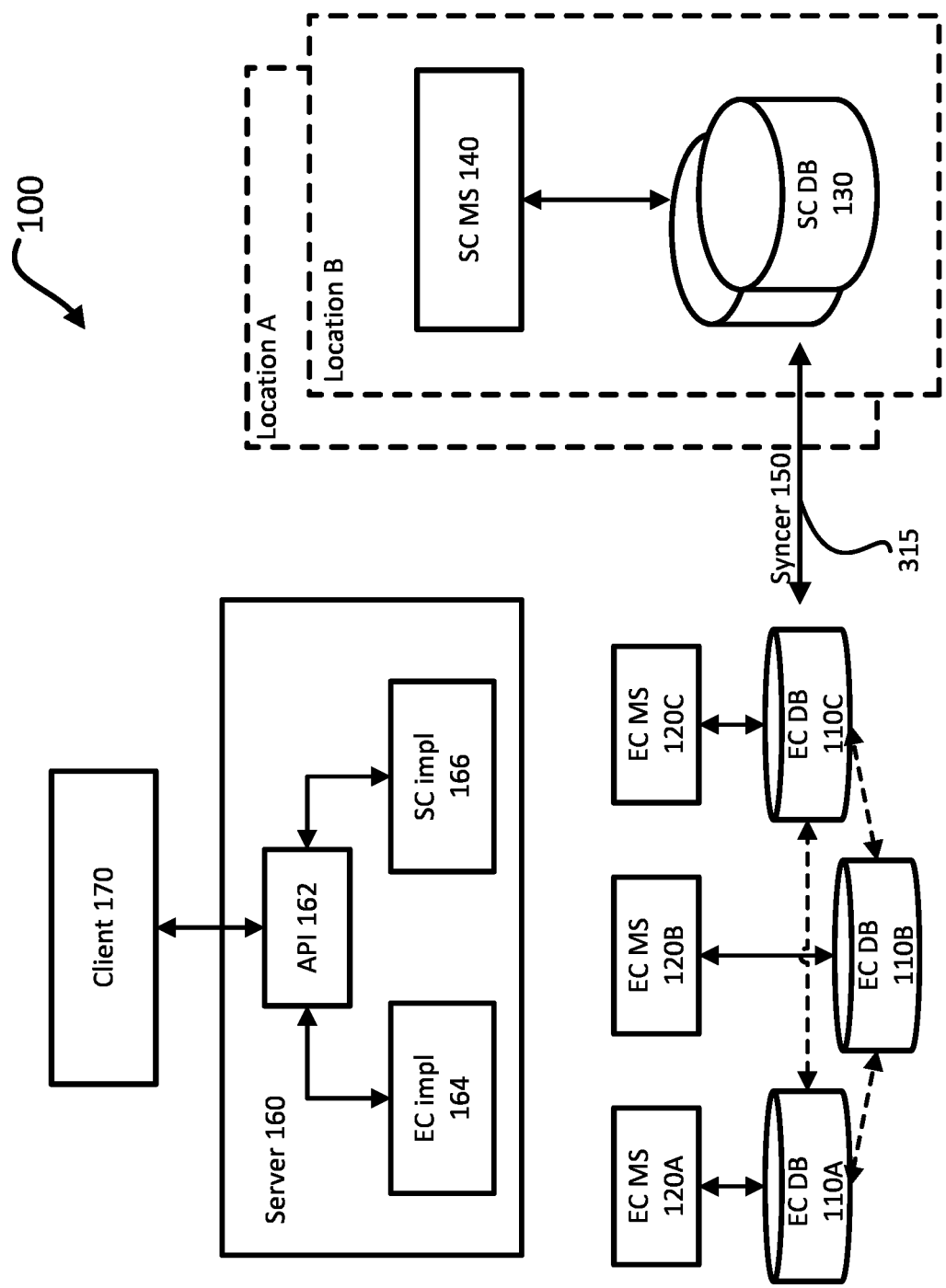
FIG. 3B depicts a block diagram of the migration system where bi-directional replication has started according to aspects of the disclosure.

As shown in block 310, and with reference to FIG. 3B, a bi-directional replication 315 is initiated between the first distributed system and the second distributed system. Bi-directional replication 315 can include iteratively and continuously reading the data from both distributed systems, comparing the data, and copying any newer data from either distributed system to the other distributed system. Metadata can be used to compare the data. How often to compare the data can depend on how many writes per second either distributed system has, how often the data can be changing, and how stale the data served from the first distributed system can be. For example, timestamps can be used to compare the data, and if data can become stale after a few hours, the data can be compared every 2 to 4 hours. The bi-directional replication can cause the first distributed system to treat the second distributed system as if the second distributed system was a replica of the first distributed system. The bi-directional replication 315 can continue throughout the process 300.

As shown in block 320, the first distributed system can initially operate as a primary system. The primary system can receive and serve write requests from clients or other devices, such as client 170.

Figure 3C:
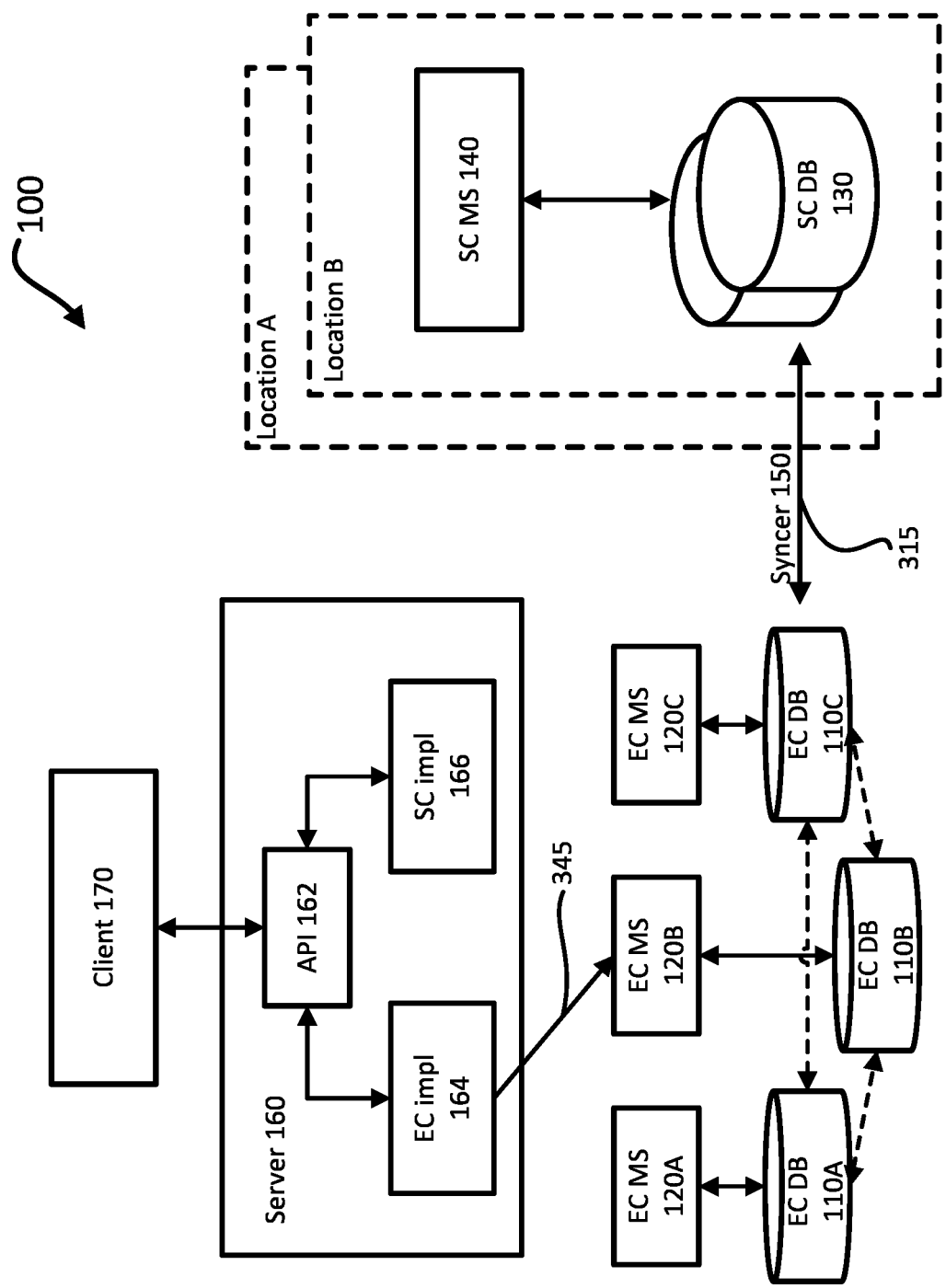
FIG. 3C depicts a block diagram of the migration system where data is written to the first distributed system according to aspects of the disclosure.
Figure 3D:
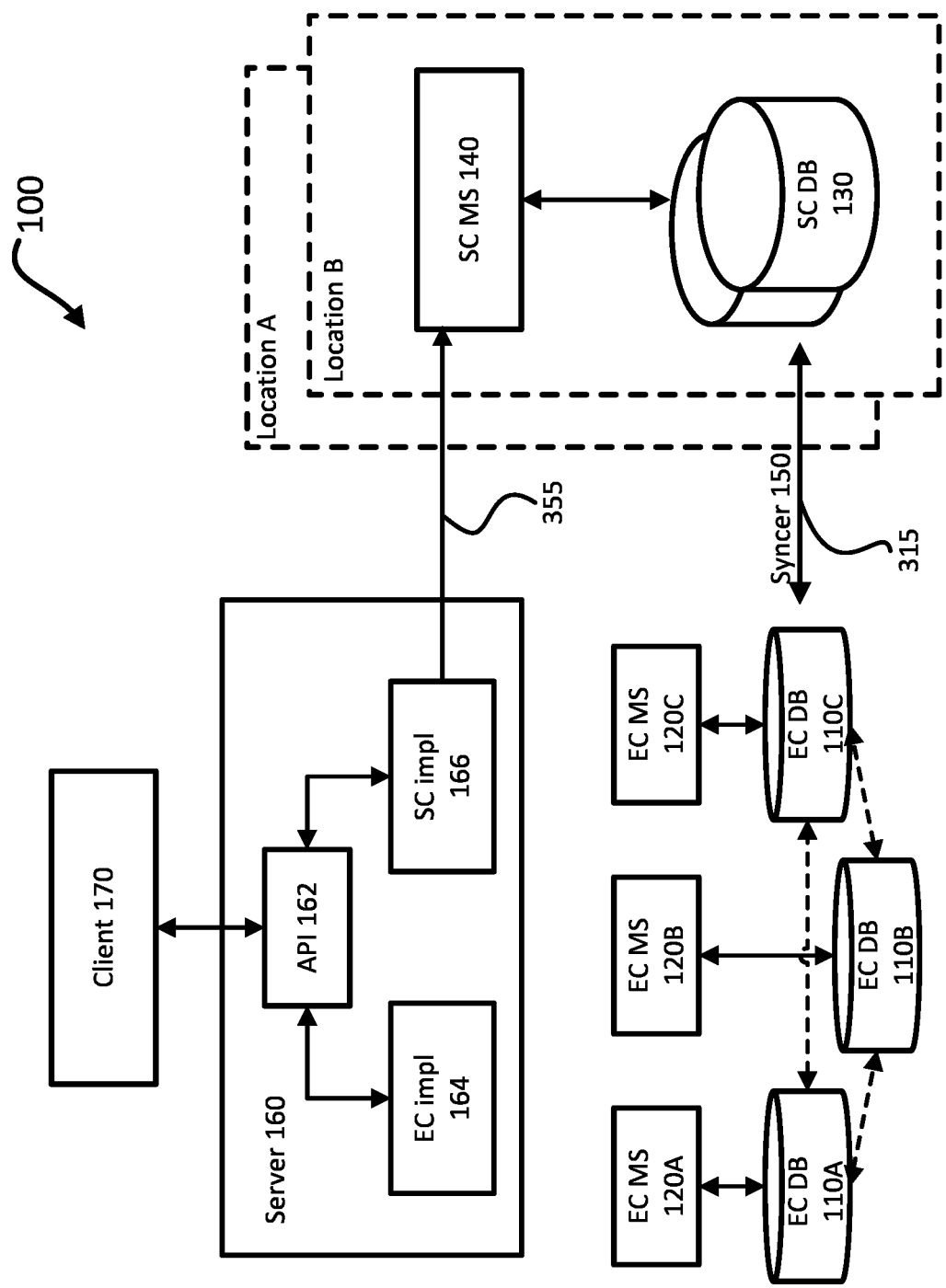
FIG. 3D depicts a block diagram of the migration system where data is asynchronously written to the second distributed system according to aspects of the disclosure.

As shown in blocks 330 and 340, and with reference to FIG. 3C, in response to a received request to write data, the data can be written 345 to the first distributed system, since it is the primary system. While data is shown being written to database replica 110B, it should be noted that data can be written to any database replica of the first distributed system. As shown in block 350, and with reference to FIG. 3D, the data can also be asynchronously written 355 to the second distributed system. For each write 345 to the first distributed system, the second distributed system is updated with an asynchronous write 355.

The asynchronous write 355 to the second distributed system may or may not be successful. For example, the asynchronous write 355 may be unsuccessful if the asynchronous write 355 is dropped or lost over the network, or the second distributed system becomes temporarily unavailable or overloaded. However, even if the asynchronous write 355 is unsuccessful, the data written 345 to the first distributed system will ultimately be copied to the second distributed system as part of the bi-directional replication 315.

As shown in block 360, the process 300 determines whether the second distributed system is caught up to the first distributed system such that both distributed systems can reflect approximately the same data. A read request served from either the first distributed system or the second distributed system should provide accurate data when the second distributed system is caught up to the first distributed system.

As an example, it may be determined that the second distributed system is caught up based on comparing timestamps of writes of data to the first distributed system and with timestamps of writes of data to the second distributed system. For instance, a most recent timestamp of a write of data to the first distributed system can be compared with a most recent timestamp of a write of data to the second distributed system. The data from the write to the first distributed system and the data from the write to the second distributed system can be the same or different. When the most recent timestamps from the first distributed system and the second distributed system are within a threshold range of one another, it can be determined that a read request served by either the first distributed system or the second distributed system can provide accurate data. Therefore, the second distributed system can be considered caught up to the first distributed system.

As another example, it may be determined that the second distributed system is caught up based on one or more aggregate differences between data in the first distributed system and data in the second distributed system. For instance, the aggregate difference can be computed by comparing per-row or per-key checksums of the two distributed systems, or by comparing data or bytes in each row of the two distributed systems. The aggregate difference used can depend on the data and data format stored in the distributed system. When the aggregate difference is below a threshold, it can be determined that a read request served by either the first distributed system or the second distributed system can provide accurate data. Therefore, the second distributed system can be considered caught up to the first distributed system.

As yet another example, it may be determined that the second distributed system is caught up based on one or more metrics reported from the bi-directional replication. For instance, metrics can include how many rows or how much data is copying in each iteration from the first distributed system to the second distributed system and/or the second system to the first system. When the bi-directional replication reports the metric below a threshold, it can be determined that a read request served by either the first distributed system or the second distributed system can provide accurate data. Therefore, the second distributed system can be considered caught up to the first distributed system.

When the second distributed system is caught up to the first distributed system, as shown in block 370, the second distributed system can be switched over to serve as the primary system. In response to a received request to write data, the data can be written to the second distributed system, since it is now the primary system.

As shown in block 380, once the second distributed system is serving as the primary system, the bi-directional replication 315 can be stopped. Maintenance of the first distributed system can be discontinued and the second distributed system can be solely relied upon for serving read and write requests.

Figure 4A:
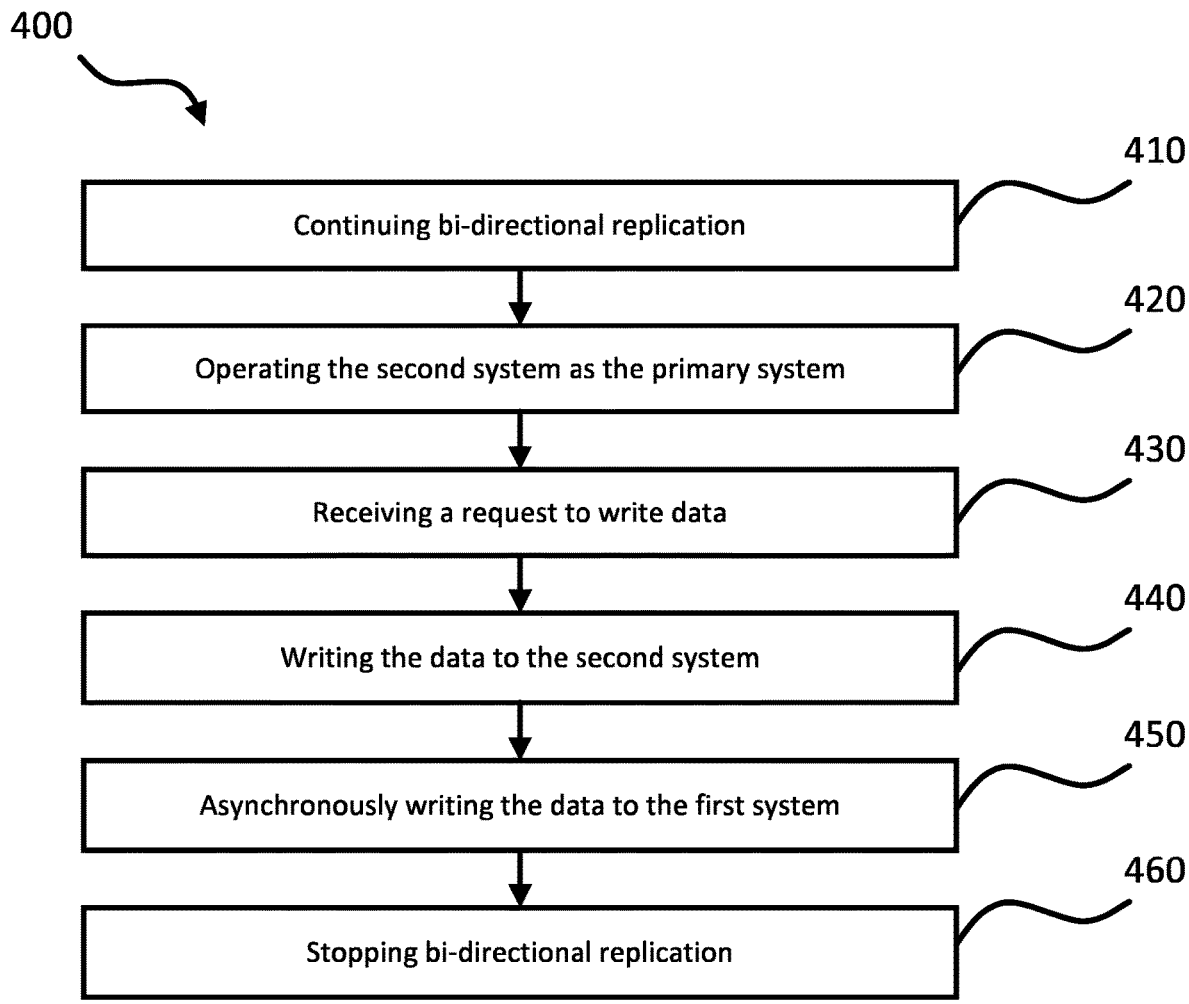
FIG. 4A depicts a flow diagram of an example process that continues the bi-directional replication for a period of time after switching the second distributed system to be the primary system according to aspects of the disclosure.

FIG. 4A depicts a flow diagram of an example process 400 that continues the bi-directional replication 315 for a period of time after switching the second distributed system to be the primary system. Continuing bi-directional replication 315 after the switch allows for instant rollback to having the first distributed system as the primary system if, for example, an issue is found with the second distributed system. Continuing bi-directional replication 315 after the switch can also ensure any leftover data in the first distributed system can be copied to the second distributed system. The example process 400 can be performed on a system of one or more processors in one or more locations. For example, the migration system 100, as described above, can perform the process 400.

Figure 4B:
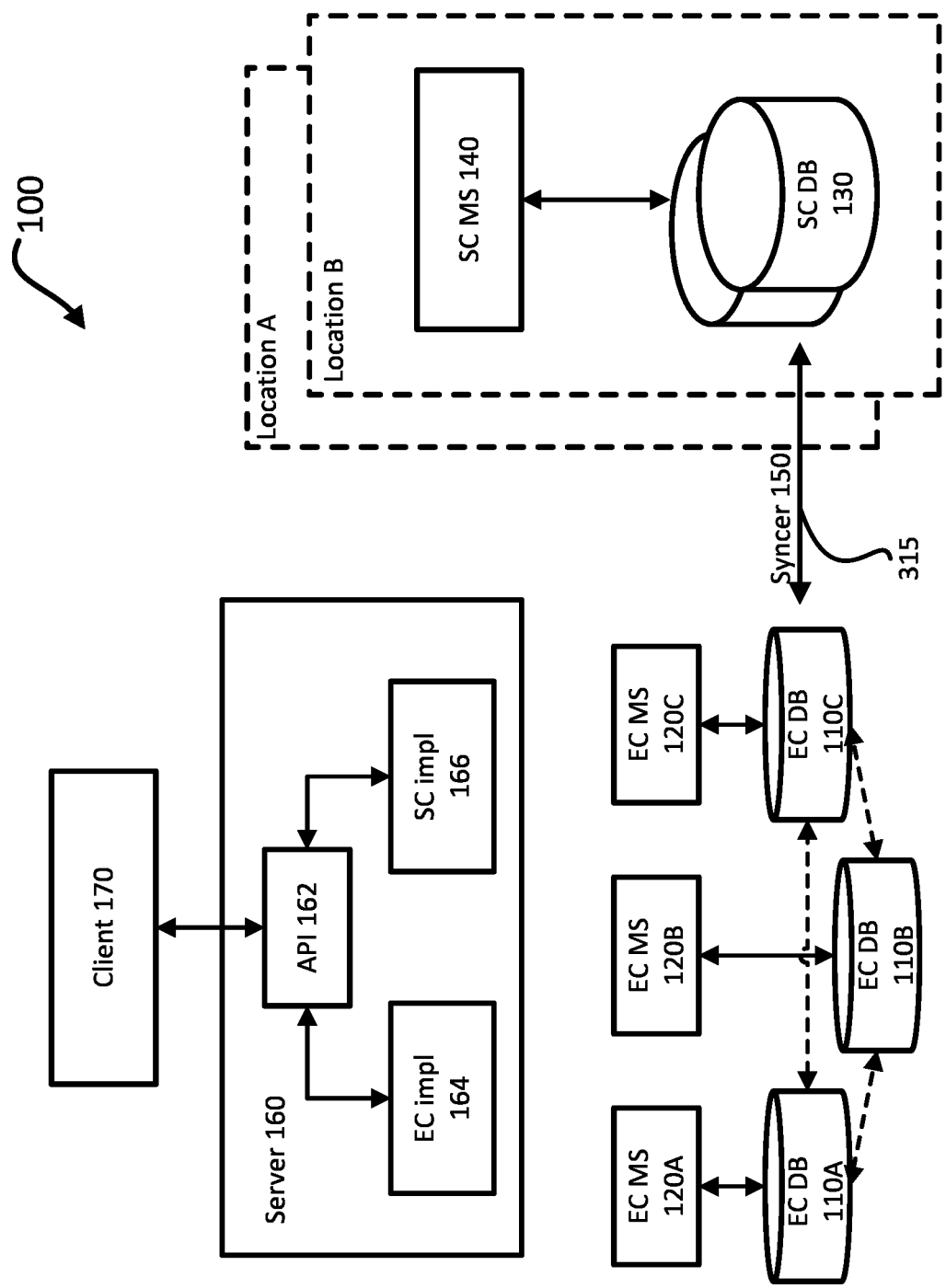
FIG. 4B depicts a block diagram of the migration system where bi-directional replication continues after switching the second distributed system to be the primary system according to aspects of the disclosure.
Figure 4C:
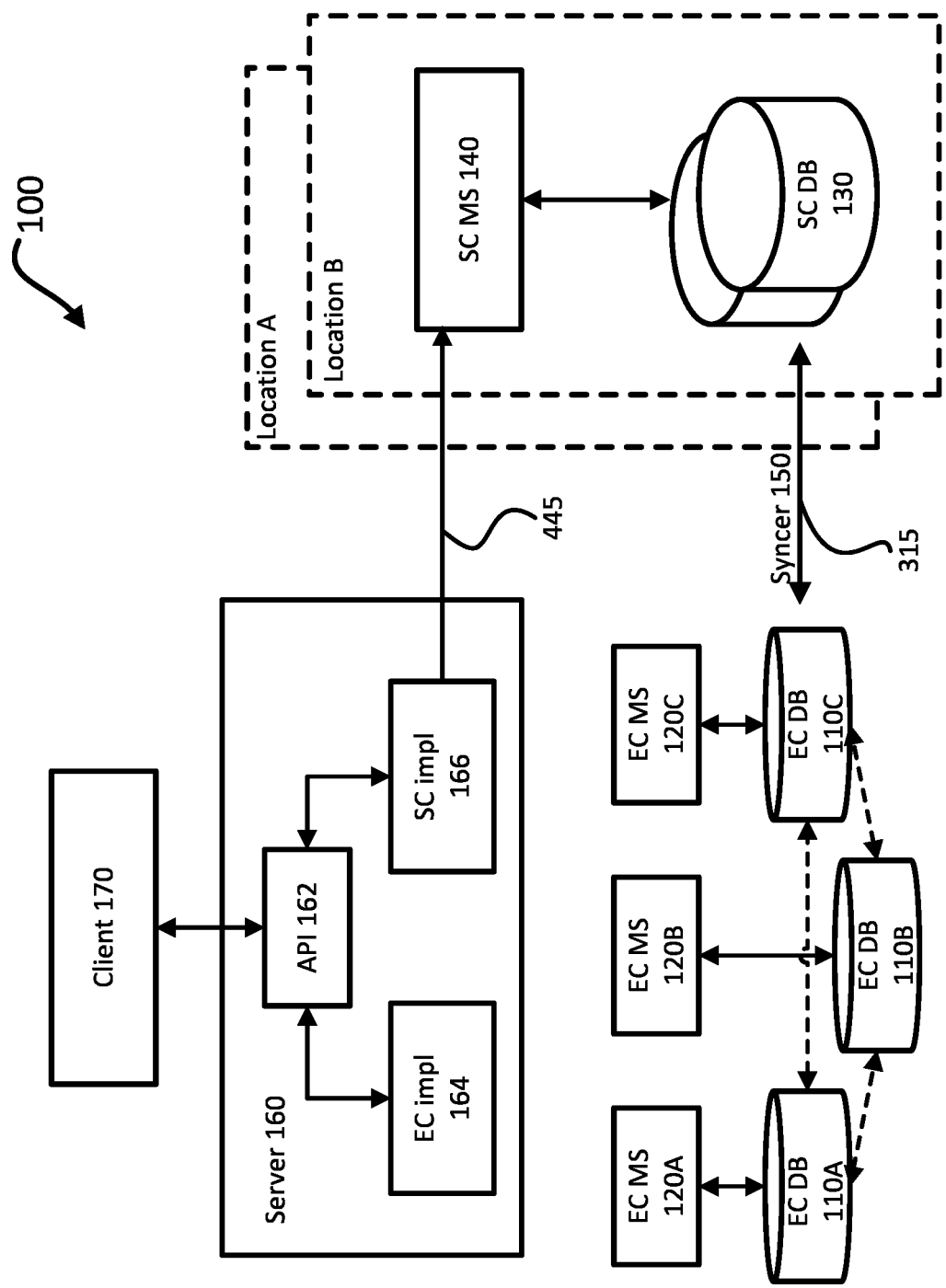
FIG. 4C depicts a block diagram of the migration system where data is written to the second distributed system according to aspects of the disclosure.
Figure 4D:
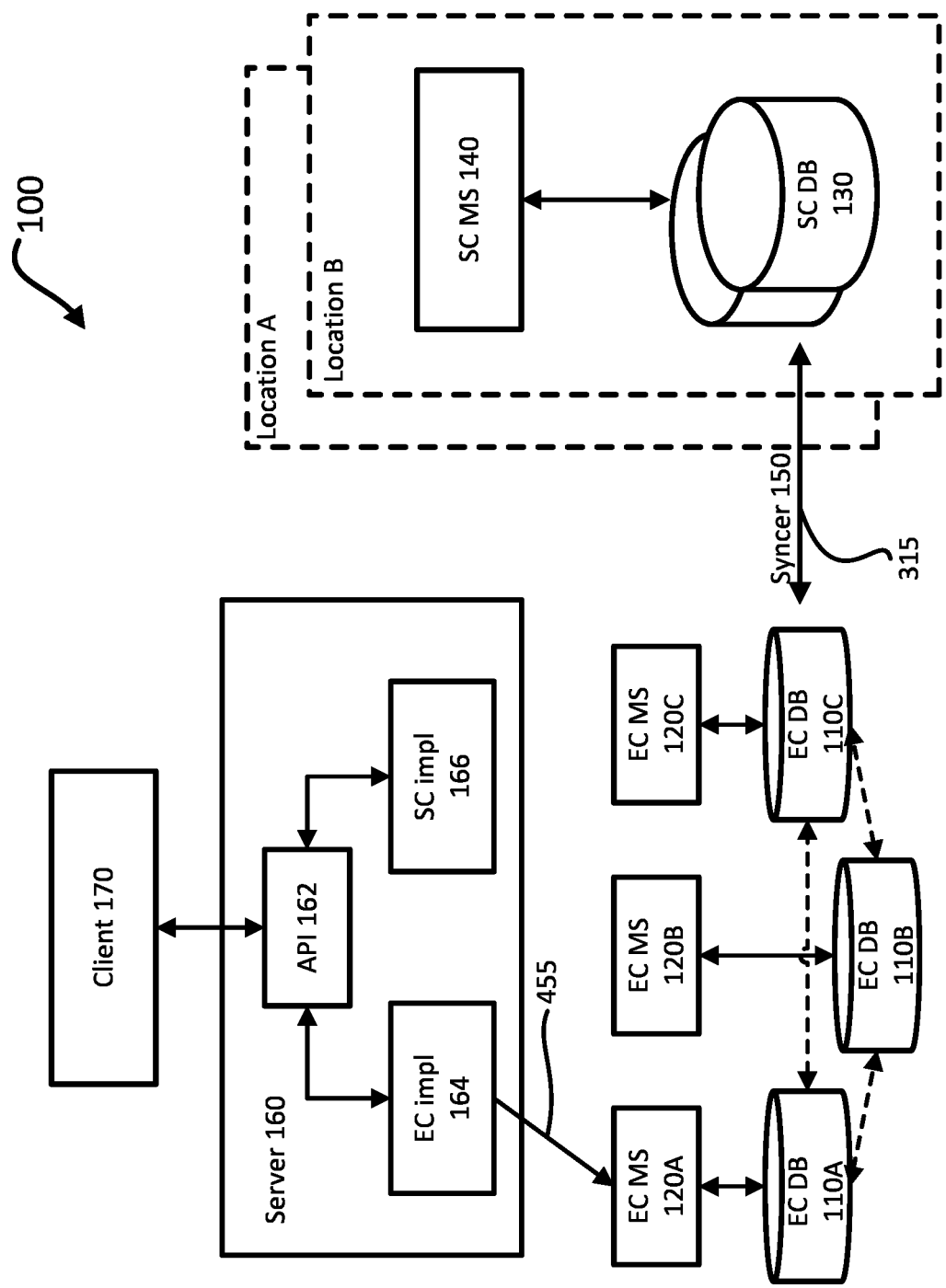
FIG. 4D depicts a block diagram of the migration system where data is asynchronously written to the first distributed system according to aspects of the disclosure.

As shown in blocks 410 and 420, and with reference to FIG. 4B, the bi-directional replication 315 continues, and the second distributed system is operated as the primary system. As shown in blocks 430 and 440, and with reference to FIG. 4C, in response to a received request to write data, the data can be written 445 to the second distributed system, since it is the primary system. As shown in block 450, the data can also be asynchronously written 455 to the first distributed system. While data is shown being written to database replica 110A, it should be noted that data can be written to any database replica of the first distributed system. For each write to the second distributed system, the first distributed system is updated with an asynchronous write.

The asynchronous write 455 to the first distributed system may or may not be successful. For example, the asynchronous write 455 may be unsuccessful if the asynchronous write 455 is dropped or lost over the network, or the first distributed system becomes temporarily unavailable or overloaded. However, even if the asynchronous write 455 is unsuccessful, the data written to the second distributed system will ultimately be copied to the first distributed system as part of the bi-directional replication 315.

As shown in block 460, after a period of time, the bi-directional replication 315 can be stopped. For example, once any remaining data still in the first distributed system but not in the second distributed system has been copied to the second distributed system, the bi-directional replication 315 can be stopped. In this example, the bi-directional replication 315 can be stopped when it reports to find zero differences for copying from the first distributed system to the second distributed system.

Figure 5:
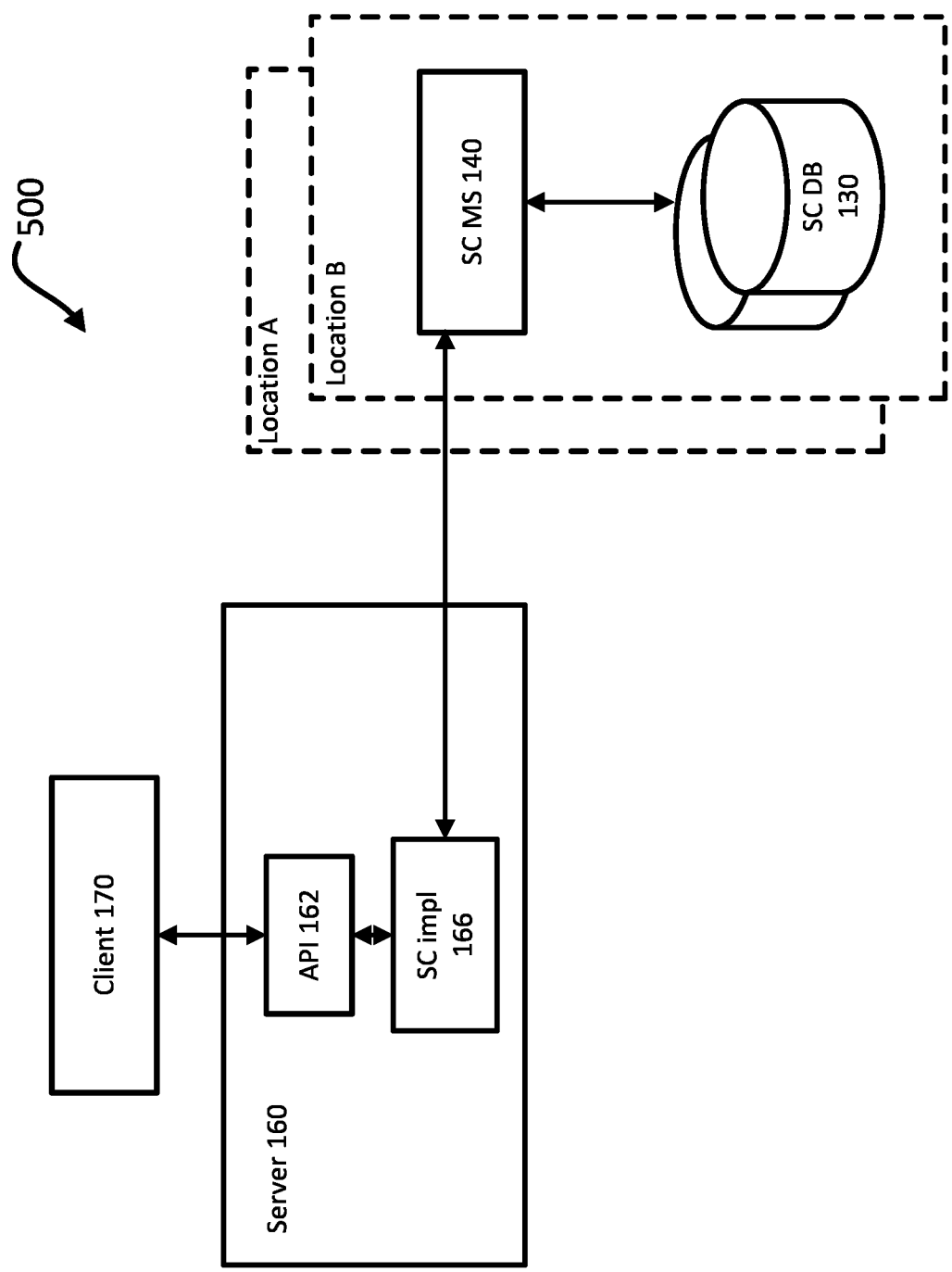
FIG. 5 depicts a block diagram of an example system after migration where the first distributed system has been discontinued according to aspects of the disclosure.

FIG. 5 depicts an example system 500 after migration where the first distributed system has been discontinued. The system 500 can include the second distributed system and the server 160. The second distributed system can include the plurality of database replicas 130 and the management systems 140 for the database replicas 130. The server 160 can include the API 162 and the second implement 166 for transmitting and/or receiving data to/from the second distributed system. The server 160 can serve read or write requests of data from the client 170 to the second distributed system. As the second distributed system can be a strongly consistent system, copies of data should be the same throughout the distributed database. For example, if a write is made by the management system 140 to the distributed database replicas 130 at a given time, and a read request for the written data is received immediately after the write, the read request should return the same result regardless of which replica 130 serves the read request.

Aspects of the approach generally disclosed herein can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as", "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for migrating data from a first type of distributed system to a second type of distributed system where transactional dual writes are not available, the method comprising:
performing, with one or more processors, a bi-directional replication of data between the first system and the second system; and
during the bi-directional replication of data:
receiving at the first system a first request to write first data;
writing, with the one or more processors, the first data to the first system;
asynchronously writing, with the one or more processors, the first data to the second system;
determining, with the one or more processors, that a read of the first data served by either the first system or the second system will provide accurate data by:
comparing a timestamp of the write of the first data to the first system with a timestamp of the asynchronous write of the first data to the second system; and
determining that the timestamp of the write of the first data to the first system is within a threshold range of the timestamp of the asynchronous write of the first data to the second system;
switching, with the one or more processors, the second system to be a primary system for serving reads and writes;
receiving at the second system a second request to write second data;
writing, with the one or more processors, the second data to the second system; and
asynchronously writing, with the one or more processors, the second data to the first system.

2. The method of claim 1, further comprising stopping, with the one or more processors, the bi-directional replication.

3. The method of claim 1, wherein the first system comprises an eventually consistent system and the second system comprises a strongly consistent system.

4. The method of claim 1, wherein the bi-directional replication comprises iteratively and continuously copying newer data from the first system to the second system.

5. The method of claim 4, wherein the bi-directional replication further comprises iteratively and continuously copying newer data from the second system to the first system.

6. The method of claim 1, further comprising determining, with the one or more processors, that a read of the first data served by either the first system or the second system will provide accurate data by:
comparing an aggregate difference between data in the first system and data in the second system; and
determining that the aggregate difference is below a threshold.

7. The method of claim 1, further comprising determining, with the one or more processors, that a read of the first data served by either the first system or the second system will provide accurate data by:
reporting, with the one or more processors, a metric from the bi-directional replication; and
determining that the reported metric is below a threshold.

8. The method of claim 7, wherein the reported metric comprises how many rows or how much data is copying in each iteration from the first system to the second system or the second to the first system.

9. A system comprising:
one or more processors; and
one or more storage devices coupled to the one or more processors and storing instructions, when performed by the one or more processors, causes the one or more processors to perform operations for migrating data from a first type of distributed system to a second type of distributed system where transactional dual writes are not available, the operations comprising:
performing a bi-directional replication of data between the first system and the second system; and
during the bi-directional replication of data:
writing first data to the first system based on a received first request to write the first data;
asynchronously writing the first data to the second system;
determining that a read of the first data served by either the first system or the second system will provide accurate data by:
comparing a timestamp of the write of the first data to the first system with a timestamp of the asynchronous write of the first data to the second system; and
determining that the timestamp of the write of the first data to the first system is within a threshold range of the timestamp of the asynchronous write of the first data to the second system;
switching the second system to be a primary system for serving reads and writes;
writing second data to the second system based on a received second request to write the second data; and
asynchronously writing the second data to the first system.

10. The system of claim 9, wherein the operations further comprise stopping the bi-directional replication.

11. The system of claim 9, wherein the first system comprises an eventually consistent system and the second system comprises a strongly consistent system.

12. The system of claim 9, wherein the bi-directional replication comprises iteratively and continuously copying newer data from the first system to the second system.

13. The system of claim 12, wherein the bi-directional replication further comprises iteratively and continuously copying newer data from the second system to the first system.

14. The system of claim 9, wherein the operations further comprise determining that a read of the first data served by either the first system or the second system will provide accurate data by:
comparing an aggregate difference between data in the first system and data in the second system; and
determining that the aggregate difference is below a threshold.

15. The system of claim 9, wherein the operations further comprise determining that a read of the first data served by either the first system or the second system will provide accurate data by:
reporting a metric from the bi-directional replication; and
determining that the reported metric is below a threshold.

16. The system of claim 15, wherein the reported metric comprises how many rows or how much data is copying in each iteration from the first system to the second system or the second to the first system.

17. A non-transitory computer readable medium for storing instructions that, when executed by one or more processors, causes the one or more processors to perform operations for migrating data from a first type of distributed system to a second type of distributed system where transactional dual writes are not available, the operations comprising:
   performing a bi-directional replication of data between the first system and the second system; and
   during the bi-directional replication of data:
      writing first data to the first system based on a received first request to write the first data;
      asynchronously writing the first data to the second system;
   determining that a read of the first data served by either the first system or the second system will provide accurate data by:
      comparing a timestamp of the write of the first data to the first system with a timestamp of the asynchronous write of the first data to the second system; and
      determining that the timestamp of the write of the first data to the first system is within a threshold range of the timestamp of the asynchronous write of the first data to the second system;
   switching the second system to be a primary system for serving reads and writes;
   writing second data to the second system based on a received second request to write the second data; and
   asynchronously writing the second data to the first system.

18. The non-transitory computer readable medium of claim 17, wherein the operations further comprise determining, with the one or more processors, that a read of the first data served by either the first system or the second system will provide accurate data by:
   reporting a metric from the bi-directional replication; and
   determining that the reported metric is below a threshold, wherein the reported metric comprises how many rows or how much data is copying in each iteration from the first system to the second system or the second to the first system.

* * * * *